US012360011B2

(12) United States Patent
Turcato et al.

(10) Patent No.: US 12,360,011 B2
(45) Date of Patent: Jul. 15, 2025

(54) SYSTEM AND METHOD FOR AUTOMATIC DETECTION OF DUAL WHEELS

(71) Applicant: AGCO International GmbH, Neuhausen (CH)

(72) Inventors: Paolo Turcato, Breganze (IT); Filippo Carollo, Breganze (IT); Andrea Dal Soglio, Breganze (IT)

(73) Assignee: AGCO International GmbH, Neuhausen (CH)

( * ) Notice: Subject to any disclaimer, the term of this patent is extended or adjusted under 35 U.S.C. 154(b) by 351 days.

(21) Appl. No.: 17/855,064

(22) Filed: Jun. 30, 2022

(65) Prior Publication Data
US 2023/0010718 A1   Jan. 12, 2023

(30) Foreign Application Priority Data

Jul. 7, 2021 (GB) ..................... 2109790

(51) Int. Cl.
| | |
|---|---|
| *A01D 41/127* | (2006.01) |
| *G01B 11/22* | (2006.01) |
| *G01B 17/00* | (2006.01) |
| *G01M 17/02* | (2006.01) |

(52) U.S. Cl.
CPC ......... *G01M 17/025* (2013.01); *A01D 41/127* (2013.01); *G01B 11/22* (2013.01); *G01B 17/00* (2013.01); *G01M 17/027* (2013.01)

(58) Field of Classification Search
CPC .................... B60C 23/068; B60C 23/007
See application file for complete search history.

(56) References Cited

U.S. PATENT DOCUMENTS

| | | | |
|---|---|---|---|
| 6,469,266 B2 * | 10/2002 | Taylor ................... | E01F 11/00 200/86 R |
| 11,110,771 B2 | 8/2021 | Ducroquet | |
| 2011/0126617 A1 * | 6/2011 | Bengoechea Apezteguia ............ | G01B 9/02092 73/146 |

(Continued)

FOREIGN PATENT DOCUMENTS

| | | |
|---|---|---|
| EP | 2982228 A1 | 2/2016 |
| KR | 20090012154 U | 12/2009 |

OTHER PUBLICATIONS

Telford, Illinois Introduces Screening System for Flat Tires at Weigh Stations, Guardian, vol. 26, issue 1, p. 12, 2019 (Year: 2019).*

(Continued)

*Primary Examiner* — Timothy P Graves

(57) ABSTRACT

A distance sensor is used for automatically detecting whether an outer wheel of a dual-wheel axle is present. The distance sensor is mounted to detect a distance between the sensor and an outer wheel of a dual-wheel axle. A controller compares the distance information with an expected range of distances if the outer wheel is present and determines that the wheel is not present if the measured distance falls outside the expected range. The methods and systems are particularly suitable for mobile machines, such as a combine harvester, having a rollover risk reduction system and/or a stability control system reliant on accurate width data for the machine, and which can be configured to apply different limits for maximum steering angle and/or maximum speed depending on whether the outer wheel is found to be present.

21 Claims, 5 Drawing Sheets

(56) References Cited

U.S. PATENT DOCUMENTS

| | | |
|---|---|---|
| 2012/0028056 A1 | 2/2012 | Tasich et al. |
| 2016/0018252 A1* | 1/2016 | Hanson ............... G01G 19/024 73/774 |
| 2020/0004757 A1 | 1/2020 | Seitel et al. |
| 2020/0062241 A1 | 2/2020 | Kelber |

OTHER PUBLICATIONS

Michael Wieck, 2018, TACS experience in select states, presentation (Year: 2018).*

UK Intellectual Property Office, Search report for related UK Application No. GB2109790.2, dated Jan. 7, 2022.

* cited by examiner

SYSTEM AND METHOD FOR AUTOMATIC DETECTION OF DUAL WHEELS

CROSS-REFERENCE TO RELATED APPLICATION

This application claims the benefit of the filing date of U.K. Patent Application 2109790.2, "System and Method for Automatic Detection of Dual Wheels," filed Jul. 7, 2021, the entire disclosure of which is incorporated herein by reference.

FIELD

The present disclosure is particularly concerned with methods and systems for automatically detecting dual wheels, especially on a mobile agricultural machine or similar off-road vehicle. The present disclosure is directed in particular at methods and systems for automatically determining whether or not the outer wheels of a dual-wheel axle are present.

BACKGROUND

Combine harvesters are agricultural mobile machines with rear-wheel steering systems and are naturally unstable due to oversteer. A combine harvester (herein also referred to simply as a harvester) also possesses a high center of gravity. If an operator is not fully concentrated, the instability created by the machine dynamics of rear-wheel steering combined with the high position of center of mass of the harvester may lead to a rollover event when the harvester travels at higher speeds. Harvesters have a tendency to rollover in case of over-steering during an evasive maneuver at higher speed in on-road conditions. Other agricultural mobile machines suffer similar issues. For example, tractors also have a relatively high center of gravity and so are potentially prone to rollover events when cornering at higher speeds.

Different proposals to reduce the risk of a rollover event in agricultural mobile machines occurring are known. These include control systems which use algorithms to limit maximum speed and/or steering angle to avoid, or at least reduce the risk, of an overturning event. For example, U.S. Patent Application Publication US2020/0062241 A1, "Anti-rollover for Harvesters with Electronic Steering," published Feb. 27, 2020, discloses a steer-by-wire system configured to provide rear-wheel-based steering particularly suitable for a harvester. The system reduces a risk of rollover by limiting a steering angle of the machine, beyond which a rollover condition occurs, based on computation of a rollover equation with parameters corresponding to inputs from various sensors and machine geometry. Tractors may also be provided with stability control systems to reduce the risk of a rollover event by, for example, limiting the machine's speed and/or steering angle. These and other rollover risk reductions systems and methods require inputs relating to the machine geometry, including the effective width of the machine.

For the purposes of stability control, the effective width of a machine is often taken as the distance measured between the centerlines of the tires on an axle, e.g., where the tires contact the ground. This is referred to as axle distance or length d. Where an axle is fitted with dual wheels, the axle length d is measured between the center lines of the outer wheels. If a machine has axles with different axle lengths d, the longest axle length d is generally used for the purposes of stability control. For example, it is known for a harvester to have single wheels on the rear axle and dual wheels on the front axle so that front axle has a longer axle length d than the rear axle. Tractors may also be provided with dual wheels on at least one axle. Where the maximum effective width of a machine is defined by an axle with dual wheels, the axle length dimension d defined between the center lines of the outer wheels on the dual-wheel axle will usually be taken as a width dimension of the machine used in an algorithm forming part of a rollover risk reduction and/or other stability control system.

The known rollover risk reduction systems are effective but are inherently reliant on the use of accurate geometry data for the machine. If the actual effective width of the machine is less than the effective width assumed in the algorithm, this can lead to a potentially dangerous situation. In the case of mobile machines designed to be operated with dual wheels, the effective width of the machine will be assumed to be that of the machine with the outer wheels present. However, it is possible for an operator to remove the outer wheels of a dual-wheel axle and operate the machine with only single wheels on the axle. In this case, the actual effective width of the machine may be less than that assumed by a rollover risk reduction/stability control system.

BRIEF SUMMARY

Some embodiments relate to a method of detecting the presence of dual wheels on a dual-wheel axle of a mobile machine, a method of reducing the risk of a rollover in a mobile machine, a system for automatically detecting the presence of dual wheels on a dual-wheel axle, a rollover risk reduction system for a mobile machine, and a mobile machine itself.

In some embodiments, a method of detecting the presence of dual wheels on a dual-wheel axle of a mobile machine comprising using a distance sensor mounted to the mobile machine to determine whether an outer wheel of the dual-wheel axle is present.

Use of a distance sensor provides a reliable way of determining whether an outer wheel forming part of a dual wheel assembly on the axle is present. This information can be used by one or more controllers of the machine to ensure that safety protocols or systems are using accurate width data based on the presence or absence of the outer wheel. For example, a rollover prevention system of the machine may adopt different maximum steering angles or maximum vehicle speeds depending on whether the outer wheel is determined to be present or not.

The distance sensor is located on the mobile machine and configured to detect distance information, and the method may comprise using one or more appropriately configured controllers to receive the distance information from the distance sensor and to determine whether the outer wheel is present in dependence on the distance information received. The distance sensor may be mounted to the mobile machine at a location that, in normal use at least, is at a known distance relative to a location occupied by the outer wheel. The distance sensor may be configured to detect information relating to the distance between the sensor (or a known datum fixed relative to the sensor) and a part of the outer wheel, when the outer wheel is present. In an embodiment, the distance sensor is configured to detect information relating to the distance between the sensor (or a known datum fixed relative to the sensor) and an outer circumferential surface of a tire of the outer wheel. The distance sensor may be directed toward a location occupied by the outer circumferential surface of the tire when the outer wheel is present to detect a distance from the sensor to the outer circumferential surface of the tire.

The distance sensor may be mounted to a body or other structural component of the mobile machine at a known distance from the outer wheel. The distance sensor may be mounted to a body or other structural component of the mobile machine at a known distance from an axis of rotation of the outer wheel. The distance sensor may be mounted to a body or other structural component of the mobile machine at a location which is at a fixed, or at least a known, distance from the outer wheel.

In an embodiment, the method comprises using respective distance sensors to determine whether or not an outer wheel is present on either side of the dual-wheel axle.

The method may comprise using one or more controllers configured to determine that an outer wheel is present if the distance information from the distance sensor falls within a predefined threshold range of expected distances indicative of the outer wheel being present and to determine that the outer wheel is not present if the distance information falls outside of the threshold range.

The outer circumference of the tire will typically have a tread in the form of a number of lugs, blocks, ribs or the like (collectively referred to as "tread features") arranged in a pattern and separated by grooves. The distance from the sensor to the outer circumferential surface of a tire will depend on whether this is measured to the outer surface of a tread feature or to the base of a groove. A minimum distance between the distance sensor and the tire is measured at the outer surfaces of the tread features, and a maximum distance between the tire and the distance sensor is measured at the bottom of the grooves between tread features. The distance will also vary depending on tire wear and tire inflation pressure. Accordingly, the threshold range of expected distances may be defined to encompass any acceptable distance between the sensor and the circumferential outer surface of the tire regardless of where on the outer circumferential surface on the tire the distance is measured, allowing for tire wear, tire pressure inflation pressures, and tolerances. Thus the threshold range may include the expected minimum and maximum distances between the distance sensor and tire, allowing for wear, inflation pressure, tolerances, etc. Alternatively, the threshold range may only encompass an acceptable range for the expected minimum distance as measured between the sensor and the outer surfaces of the tread features, again allowing for tire wear, tire pressure, and tolerances.

The method may comprise measuring the distance between the sensor and the outer circumferential surface of the tire in at least one of two modes. In an absolute mode, a minimum distance between the sensor and the tire is measured at the outer surfaces of the tread features. In a relative mode, differences between a minimum distance between the sensor and the tire measured at the outer surfaces of the tread features and a maximum distance measured at the bottom of the grooves as the wheel rotates is used to determine the depth of the tread.

The method may comprise using the relative mode of measurement when the machine is moving to confirm that the sensor arrangement is operating correctly.

The distance between the sensor and an outer circumferential surface of a tire will also be dependent on the size of the wheel fitted. If a machine is designed to be used with different sized wheels, the threshold range of expected distances may be configured to encompass all acceptable wheel sizes for the machine. Alternatively, the method may comprise adopting a threshold range dependent on the size of the wheel fitted to the machine. In this case, a predefined threshold range may be pre-set, depending on which size wheels are fitted by the manufacturer, or the method may comprise inputting data regarding the wheel size fitted. In this latter case, the controller(s) may be configured to select an appropriate threshold range from a number of predefined threshold ranges based on the wheel size data input. In a further alternative, the method may comprise automatically determining the wheel size using the distance information provided by the distance sensor. If the distance sensor is configured to detect information regarding the distance between the sensor and an outer circumferential surface of the tire of a wheel, the controller(s) may be configured to use this information to determine the size of the wheel. The controller(s) may be configured to determine the radius of the wheel, or some other related dimension such as the diameter. The method may comprise determining from the measured wheel radius which one of a range of standard wheel sizes the wheel conforms to (i.e., the size of the wheel fitted to the machine). The method may comprise comparing the measured wheel radius with data relating to a range of standard wheel sizes stored in a lookup table. The method may comprise storing wheel size data relating to a range of standard wheels sizes in a memory accessible to the controller(s).

If the method comprises automatically determining the size of the wheel, the method may also comprise using this information as an input to a further control system on the machine whose operation is dependent, at least to some extent, on wheel size. If the machine has an axle-height adjustment system, the method may comprise using information regarding wheel size determined by the controller(s) as an input to the axle-height adjustment system. The method may comprise using data regarding the radius of the wheel and/or standard wheel size derived from the distance sensor to determine a ground speed of the vehicle.

The method of automatically determining the size of a wheel using a distance sensor may be applied to any of the wheels on the mobile machine, including wheels which are not outer wheels of a dual-wheel axle, by use of a respective distance sensor for each wheel to be monitored, each distance sensor configured to detect information regarding distance between the sensor and an outer circumferential surface of the respective wheel, the controller(s) receiving distance information from each of the distance sensors and configured to automatically determine the size of the respective wheel based on the distance information. The method of using a distance sensor to automatically determine the size of a wheel can be adopted for mobile machines or other vehicles that do not have a dual-wheel axle.

The method may also comprise using the distance information obtained from distance sensor(s) to monitor tire wear. If a wheel has a tire fitted, the distance sensor may be configured to detect information regarding distance between the sensor and an outer circumferential surface of the tire, and the controller(s) may be configured to monitor tire wear based on the distance information. The method may comprise using the absolute mode to measure the minimum distance between the distance sensor and the outer circumferential of the tire to monitor tire wear over time and/or to use the relative mode of measurement to monitor changes in the tread depth over time. The method may comprise combining distance information obtained from the distance sensor with information regarding machine speed and/or information regarding elapsed engine operating time.

The method may comprise recording initial values for the minimum distance and/or thread depth. The method may comprise recording data relating to the minimum distance and/or tread depth, and/or changes therein, over time. The method may comprise providing an output regarding tire wear and/or an indication of the need to replace a tire. The method may comprise mapping tire wear over a lifecycle of a tire. The method may comprise calibrating the system when a tire is fitted by recording initial values for the minimum distance and/or thread depth of the tire.

The method of monitoring tire wear using a distance sensor may be extended to any of the wheels on the machine, including wheels which are not outer wheels of a dual-wheel axle, by use of a respective distance sensor for each wheel to be monitored, each distance sensor configured to detect information regarding distance between the sensor and an outer circumferential surface of a tire of the respective wheel, the controller(s) receiving distance information from each of the distance sensors and configured to monitor tire wear of each of the respective wheels in dependence on the distance information. This aspect may also be adopted in mobile machines and vehicles which do not have a dual-wheel axle.

The method may comprise using ultrasonic and/or laser distance sensors.

Some embodiments include a method of reducing the risk of a rollover event for a mobile machine having a dual-wheel axle. The method may comprise determining whether or not an outer wheel of the dual-wheel axle is present. The method may also comprise adopting a maximum steering angle and/or a maximum machine speed based on whether the outer wheels are determined to be present or absent.

Some embodiments include a system for detecting the presence of dual wheels on a dual-wheel axle of a mobile machine. The system comprises a distance sensor mounted to a mobile machine having a dual-wheel axle and at least one controller. The distance sensor is configured to detect distance information relating to a distance between the sensor (or a known datum fixed relative to the first sensor) and a part of an outer wheel of the dual-wheel axle when the outer wheel is present. The controller(s) is/are configured to receive distance information from the distance sensor and to determine whether the outer wheel is present in dependence on the distance information. The sensor may be mounted to the mobile machine at a location which is fixed relative to, or at a known distance from, a location occupied by the outer wheel when the outer wheel is present on the dual-wheel axle.

The system may comprise a second distance sensor mounted to the mobile machine. The second distance sensor is configured to detect distance information relating to a distance between the second distance sensor (or a known datum relative to the sensor) and a part of a second outer wheel of the dual-wheel axle when the second outer wheel is present. The controller(s) receives distance information from each of the distance sensors and configured to determine whether or not each of the outer wheels are present based on the distance information received from the respective distance sensor. The second sensor may be mounted to the mobile machine at a location which is fixed relative to, or at a known distance from, a location occupied by the second outer wheel when present on the dual-wheel axle.

The distance sensor may be mounted to a body or other structural component of the mobile machine at a known distance from the outer wheel. The distance sensor may be mounted to a body or other structural component of the mobile machine at a known distance from an axis of rotation of the outer wheel. The distance sensor may be mounted to a body or other structural component of the mobile machine at a location which is at a fixed, or at least a known, distance from the outer wheel.

The distance sensor(s) may be ultrasonic or laser sensors. The sensor(s) may be configured to determine distance information between the sensor and its respective wheel to a precision of ±2 mm, or a precision of ±1 mm, or better.

In an embodiment, each distance sensor is configured to detect information relating to the distance between the sensor (or a known datum fixed relative to the sensor) and an outer circumferential surface of a tire of the respective outer wheel when the outer wheel is present on the dual-wheel axle. Each distance sensor may be directed toward a location which is occupied by an outer circumferential surface (e.g., a treaded region) of the tire of the respective outer wheel when the outer wheel is present on the dual-wheel axle to detect a distance from sensor to the outer circumferential surface of the tire. Each distance sensor may be aligned longitudinally with respect to the outer circumferential surface of the tire when the respective outer wheel is present.

The system may form part of a rollover risk reduction/stability control system of a mobile machine.

If the distance sensor is configured to detect information relating to the distance between the sensor (or a known datum fixed relative to the sensor) and an outer circumferential surface of a tire of the respective outer wheel, the controller(s) may be configured to determine the radius of the respective wheel in dependence on the distance information. The controller(s) may be configured to determine from the measured wheel radius which one of a range of standard wheel sizes the wheel conforms to. The controller(s) may be configured to compare the measured wheel radius with data relating to a range of standard wheel sizes stored in a lookup table. Wheel data relating to a range of standard wheels sizes may be stored in a memory accessible to the controller(s). The controller(s) may be configured to store data relating to the determined wheel radius and/or the determined standard wheel size for use in a further control system on a mobile machine or to forward such data to the further control system. The further control system may be an axle-height adjustment system, and the system may be configured to provide information relating to the wheel radius and/or standard wheel size determined by the controller(s) as an input to the axle-height adjustment system. The system and the further control system may be part of an overall machine control system.

The term "standard wheel size" should be understood as including commercially available wheel/tire combinations for the mobile machine.

Where the distance sensor is configured to detect information relating to the distance between the sensor (or a known datum fixed relative to the sensor) and an outer circumferential surface of a tire of the respective outer wheel, the controller(s) may be configured to use the distance information provided by the distance sensor to monitor tire wear for each respective wheel. The outer circumference of the tire will typically have tread features arranged in a pattern and separated by grooves, and the controller(s) may be configured to measure the distance between the sensor and the outer circumferential of the tire in at least one of two modes. In an absolute mode, a minimum distance between the sensor and the tire is measured at the outer surfaces of the tread features. In a relative mode, differences between a minimum distance between the sensor and the tire measured at the outer surfaces of the tread features and a maximum distance measured at the bottom of the grooves as the wheel rotates is used to determine the depth of the tread.

The system may comprise one or more sensors for detecting the ground speed of the machine and/or engine use, and the controller(s) may be configured to combine distance information obtained from a distance sensor with information regarding machine ground speed and/or information regarding elapsed engine operating time.

The system may comprise one or more further distance sensors, each associated with a respective further wheel of the mobile machine, each further distance sensor configured to detect information relating to a distance between the sensor (or a known datum fixed relative to the sensor) and an outer circumferential surface of a tire of the respective further wheel, the controller(s) being configured to receive distance information from each of the distance sensors and to monitor tire wear for each respective wheel.

In some embodiments, a mobile machine has a dual-wheel axle and a system for detecting the presence of dual wheels on the dual-wheel axle as described above. The system may be configured to carry out any of the methods described above.

Optionally, the mobile machine may comprise a harvesting vehicle, such as a combine harvester.

In some embodiments, computer software includes computer readable instructions which, when executed by one or more processors, causes performance of the methods described above. In some embodiments, a computer readable storage medium comprises the computer software. Optionally, the storage medium comprises a non-transitory computer readable storage medium.

Within the scope of this application it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

Figures 1A, 1B:
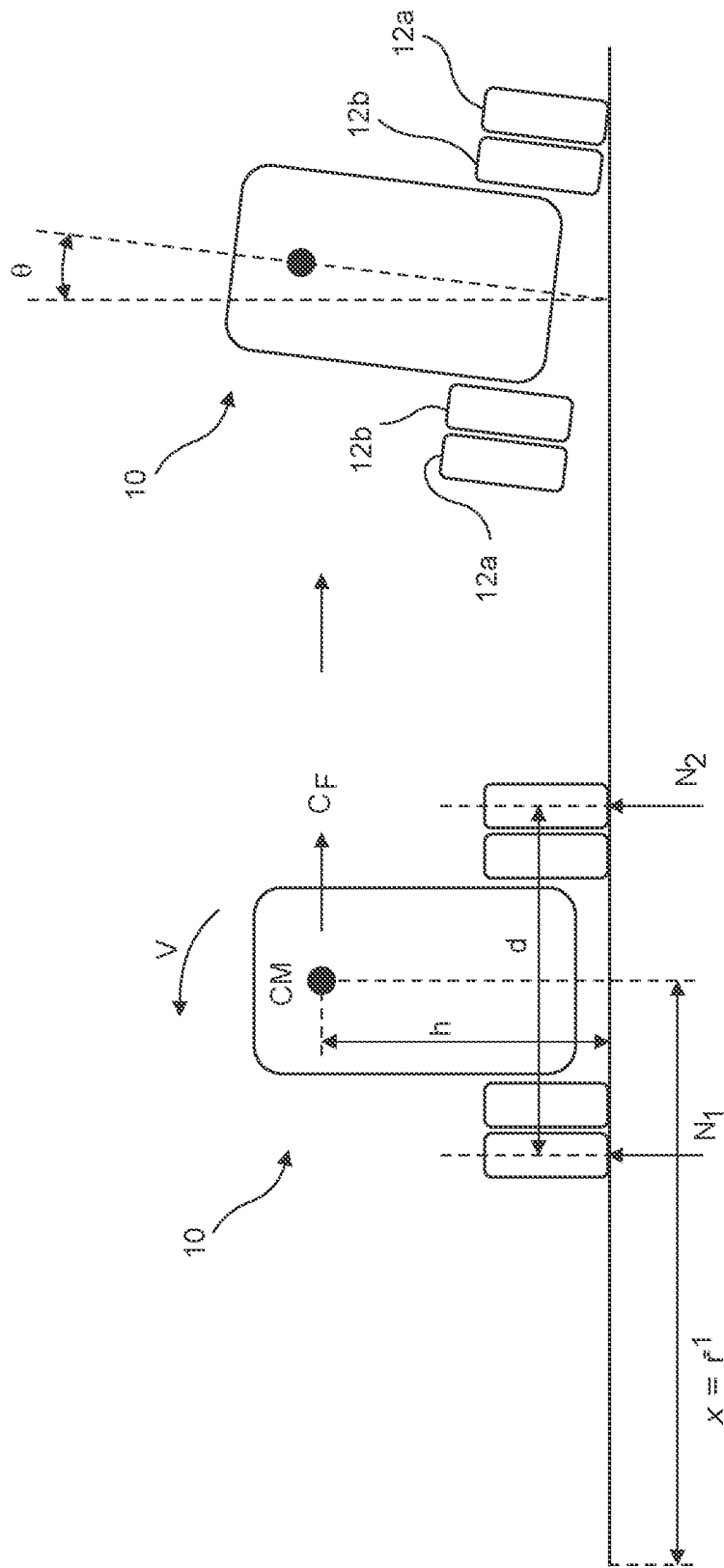
FIGS. 1A and 1B are schematic diagrams that illustrate forces applied to a combine harvester during cornering that are considered in known rollover risk reduction systems.

The illustrations presented herein are not actual views of any combine harvester or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all the elements that form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, ranges are used as shorthand for describing each and every value that is within the range. Any value within the range can be selected as the terminus of the range.

As used herein, the term "dual-wheel axle" is used to refer to an axle to which dual wheel assemblies (i.e., an inner wheel and an outer wheel) are mountable to either side (end) of the axle, regardless of whether the outer wheels are present.

Certain embodiments of a dual-wheel detection method and system use electronic functions to enable the automatic detection of the presence of dual wheels on a dual-wheel axle of a mobile machine.

The system and method are predicated on the understanding that the presence of a wheel on a mobile machine can be detected by using a distance sensor mounted on the mobile machine to measure or detect information relating to the distance between the sensor (or another datum relative to the sensor) and a part of the wheel. The distance sensor is mounted to the mobile machine at a known distance from the part of the wheel where distance measurements are to be taken, at least during use. When the wheel is present, the distance sensor will provide distance information conforming to the known distance within acceptable limits. Where the wheel is absent, the distance information provided by the distance sensor will not conform to the known distance within the acceptable limits. Accordingly, distance information from the distance sensor which conforms to the known distance can be taken to indicate that the wheel is present, and distance information not conforming to the known distance can be taken as an indication that the wheel is absent.

In the various embodiments described herein, a combine harvester is illustrative of an example of a mobile agricultural machine. However, dual-wheel detection methods and systems according to the disclosure can be adapted for use with other mobile machines, including, without limitation, self-propelled mobile machines such as tractors, mobile cranes, excavators, and the like. Indeed, dual-wheel detection methods and systems according to the disclosure can be adapted for use with any suitable mobile machine or vehicle intended to be operated with dual wheels on at least one axle, especially where the vehicle includes a safety-critical control method and/or system configured to operate on the assumption that dual wheels are present on the axle when the vehicle is in operation.

Referring now to FIGS. 1A-1B, shown is an illustration of a harvester 10 and various forces applied to the harvester 10 during cornering. The involved dimensions include axle distance or length (d), height (h) of a center of mass (CM) for the harvester 10, and curvature (X) performed by the harvester, the latter which can be considered the inverse of a curvature radius (r). When the harvester 10 corners at ground speed (v), a centrifugal force (CF) can be considered applied to its center of mass (CM). In this situation, normal forces $N_1$ and $N_2$, which are normally equal when the harvester 10 is following a straight path, become uneven and the harvester 10 tends to rollover with a roll angle (θ), as illustrated in FIG. 1B. When a rollover event starts, $N_1$ goes to zero. At this instant, the overturning curve radius is proportional to the square of the harvester speed, as set forth in the following (rollover) Equation 1:

$$r = 2 \times \frac{h}{d \times g} v^2, \quad \text{(Equation 1)}$$

where g represents earth gravity (approximately 9.8 meters per second squared).

In the rollover Equation 1, the axle distance d is indicative of the effective width of the harvester and can be measured as illustrated between the center lines of the outermost wheels 12a on a dual-wheel axle. As previously noted, if a machine has axles which have different axle distances, the longer axle distance d is used when applying the rollover equation 1.

Figure 2:
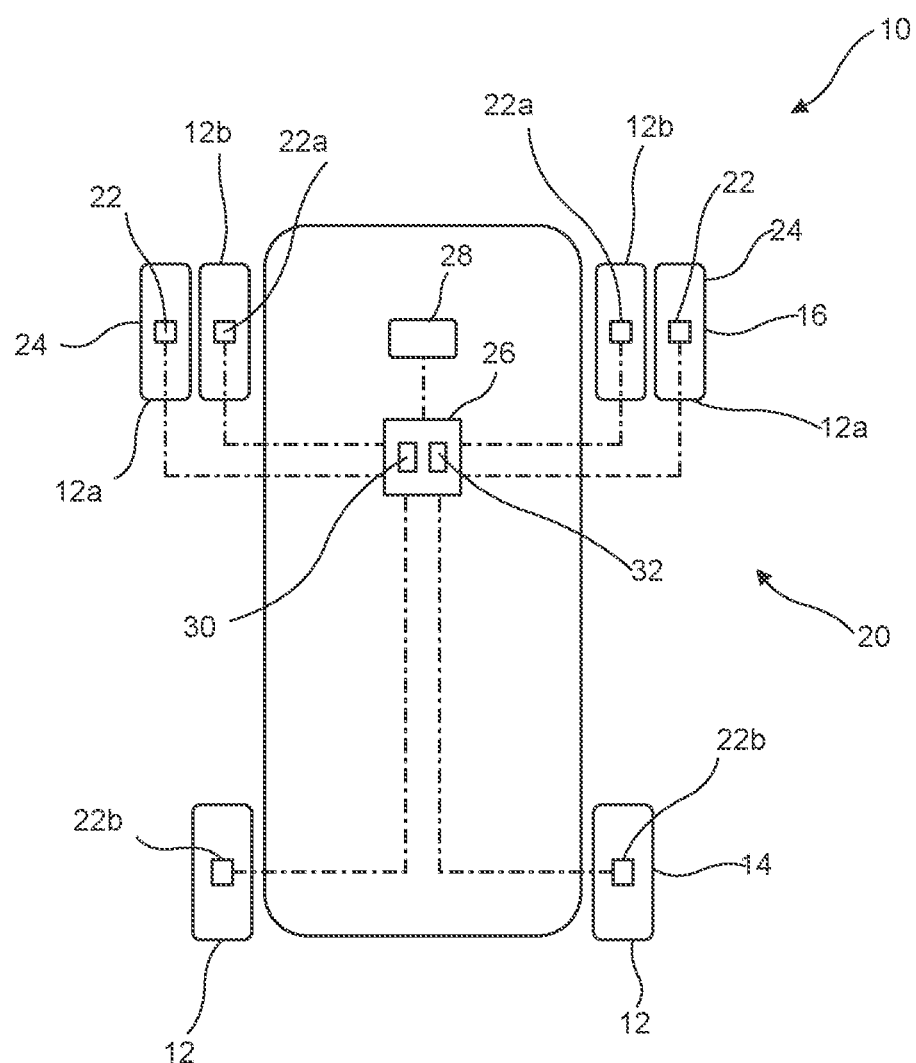
FIG. 2 is a schematic plan view of a combine harvester having an embodiment of a system for automatically detecting dual wheels.

As illustrated schematically in FIG. 2, the harvester 10 has single wheels 12 on a rear axle 14. The front axle 16 has dual wheels, with a dual-wheel assembly comprising an outer wheel 12a and an inner wheel 12b on either side. Since the front axle 16 has a longer axle distance d than the rear axle, it is the axle distance d measured between the center lines of the outer wheels 12a (as illustrated in FIG. 1A) on the dual wheel front axle which would usually be used when applying the rollover Equation 1 as part of a rollover risk reduction method and system for the harvester 10.

It should be noted that references hereinafter made to certain directions, such as, for example, "front," "rear," "left," and "right", are made as viewed from the rear of a harvester looking forward.

Though operating instructions for a machine 10 with one or more dual-wheel axles will typically require that the machine always be operated with the dual wheels present (i.e., both the outer 12a and inner 12b wheels of the dual wheel assembles at either side of the axle), it is often physically possible for the outer wheels 12a to be removed and the machine operated with only the inner wheels 12b present. Such misuse may result in safety issues because rollover risk reduction and/or other stability control systems on the machine are configured to use an axle length d defined between the outer wheels 12a of the dual-wheel axle, and because the actual effective width of the machine will be less than the assumed effective width used in the control algorithm. In this situation, the rollover risk reduction and/or stability control system may permit the machine to operate under conditions which exceed appropriate values to keep the risk of a rollover event within acceptable levels. To address this issue, FIG. 2 illustrates an embodiment of a dual-wheel detection system 20 for automatically detecting whether the outer wheels 12a on the front dual-wheel axle 16 are present. The dual-wheel detection system 20 illustrated in FIG. 2 is merely illustrative of example dual-wheel detection functionality, and that some embodiments may include different features (e.g., additional or fewer features).

The dual-wheel detection system 20 comprises a pair of distance sensors 22 mounted on the harvester 10. Each distance sensor 22 is positioned so as to be capable of detecting a distance between the sensor (i.e., a known datum) and an outer circumferential surface of a pneumatic tire 24 on a respective one of the outer wheels 12a of the dual wheel front axle 16. The system also comprises an electronic controller or electronic control unit (ECU) 26 and a human-machine interface (HMI) 28, which includes a display screen visible to an operator of the machine and user input means. The display screen may be a touch screen through which the operator is able to provide inputs and/or other user input means may be provided which could be physically separate from the display screen. Note that there may be additional components in some embodiments, including one or more controllers that cooperate to enable functionality of the dual-wheel detection system 20 and/or additional sensors, or fewer components.

The distance sensors 22 each provide an input signal to the ECU 26 indicative of a detected distance between the sensor and the outer circumferential surface of the tire 24 of its respective wheel when the wheel is present on the axle. Electronic communications among the various components of the dual-wheel detection system 20 may be achieved over a controller area network (CAN) bus or via a communications medium using other standard or proprietary communication protocols (e.g., RS-232, etc.). Communication may be achieved over a wired medium, wireless medium, or a combination of wired and wireless media.

The ECU 26 provides the control logic for dual-wheel detection functionality. The ECU 26 may be part of a rollover risk reduction and/or stability control system such as that disclosed in U.S. Patent Application Publication US2020/0062241 A1 referenced above, for example, or any other suitable rollover risk reduction/stability control system regardless of whether or not the machine is steer-by-wire. The ECU 26 may be part of a general control system for the machine.

In one embodiment, the ECU 26 comprises one or more processors, such as processor 30, input/output (I/O) interface (s) (in this embodiment the HMI 28), and memory 32, all coupled to one or more data buses. The memory 32 may include any one or a combination of volatile memory elements (e.g., random-access memory RAM, such as DRAM, and SRAM, etc.) and non-volatile memory elements (e.g., ROM, hard drive, tape, CDROM, etc.). The memory 32 may store a native operating system, one or more native applications, emulation systems, or emulated applications for any of a variety of operating systems and/or emulated hardware platforms, emulated operating systems, etc. In one embodiment, the memory comprises an operating system and dual-wheel detection software which may be part of a rollover risk reduction or other stability control software. In some embodiments, additional or fewer software modules (e.g., combined functionality) may be stored in the memory 32 or additional memory. In some embodiments, a separate storage device may be coupled to the data bus, such as a persistent memory (e.g., optical, magnetic, and/or semiconductor memory and associated drives).

The processor 30 may be embodied as a custom-made or commercially available processor, a central processing unit (CPU) or an auxiliary processor among several processors, a semiconductor based microprocessor (in the form of a microchip), a macro processor, one or more application specific integrated circuits (ASICs), a plurality of suitably configured digital logic gates, and/or other well-known electrical configurations comprising discrete elements both individually and in various combinations to coordinate the overall operation of the controller 26.

The distance sensors 22 can be of any suitable type as are well known in the art capable of detecting the distance between the sensor and the outer circumferential surface of the tire 24 to a suitable level of accuracy. In embodiments, the distance sensors 22 are ultrasonic or laser distance sensors. In an embodiment, the distance sensors 22 are positioned such that an axis of measurement is directed toward the outer circumferential surface of the corresponding tire 24.

Figure 3:
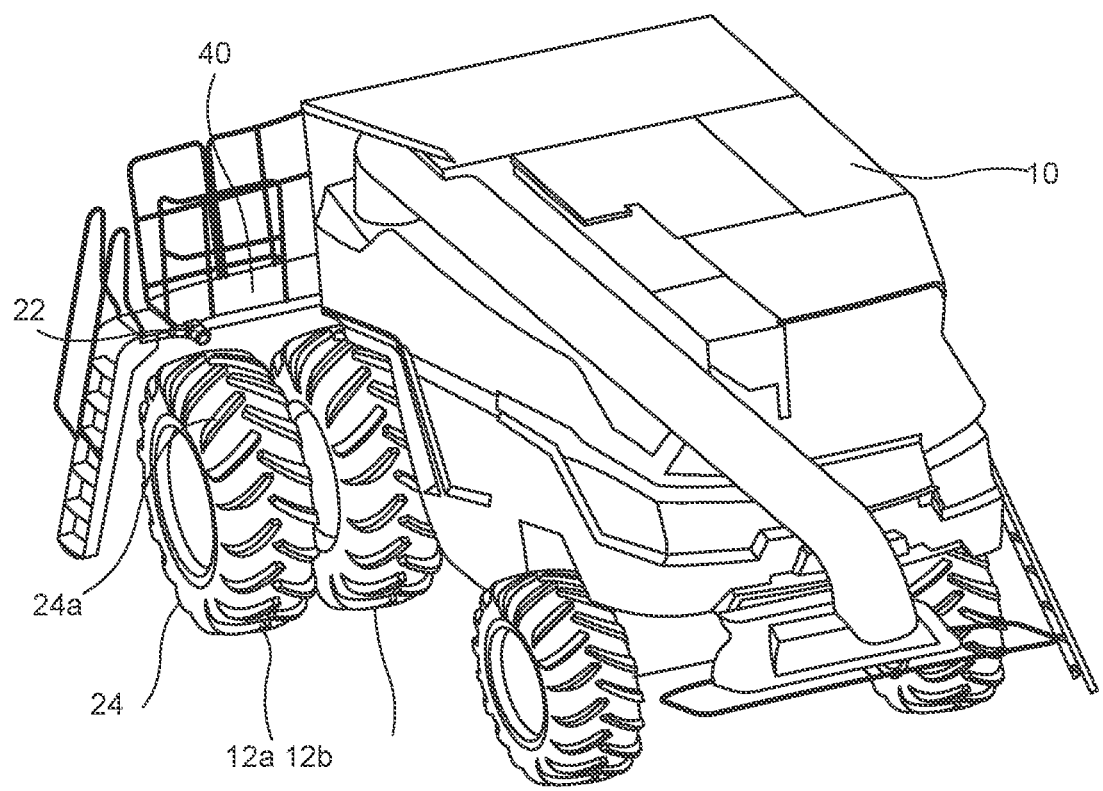
FIG. 3 is a perspective view of part of a combine harvester illustrating one possible location of a distance sensor forming part of the system of FIG. 2, the distance sensor being located for automatically detecting an outer wheel on one side of a dual-wheel axle.
Figure 4:
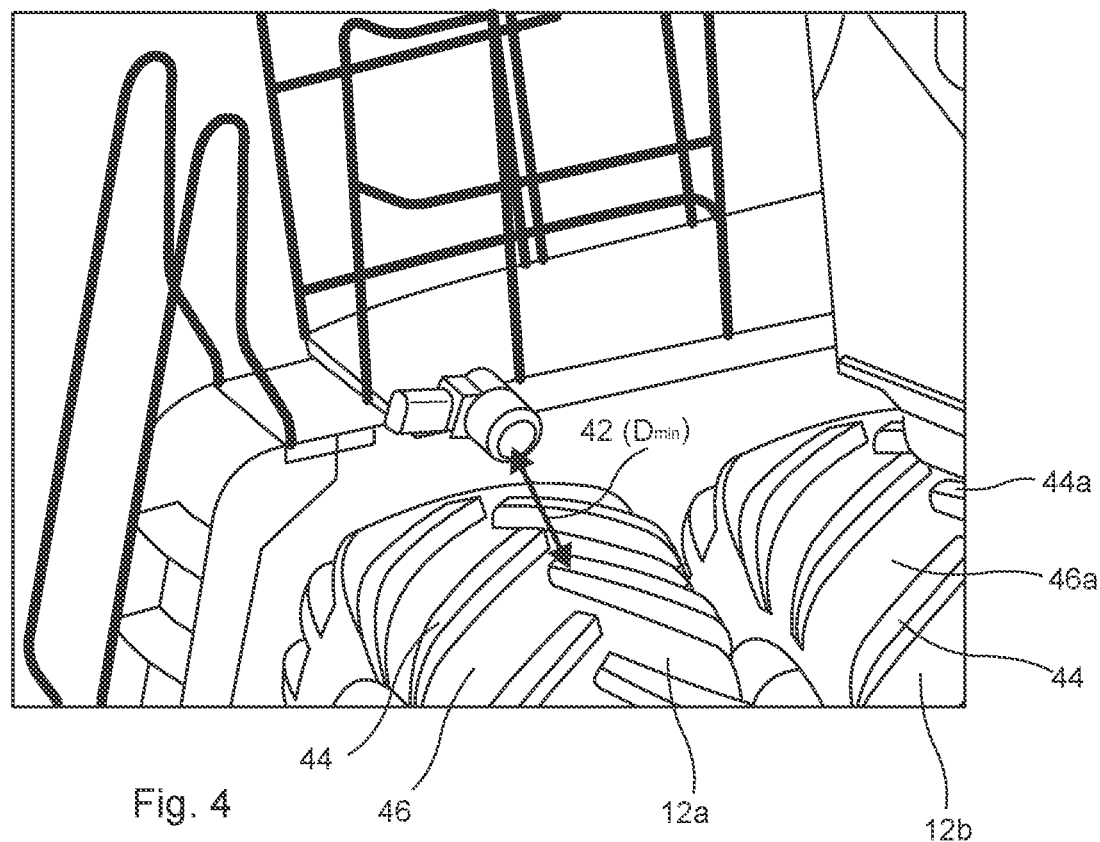
FIG. 4 is a partial view of the combine harvester of FIG. 3, illustrating operation of the distance sensor when an outer wheel is present.
Figure 5:
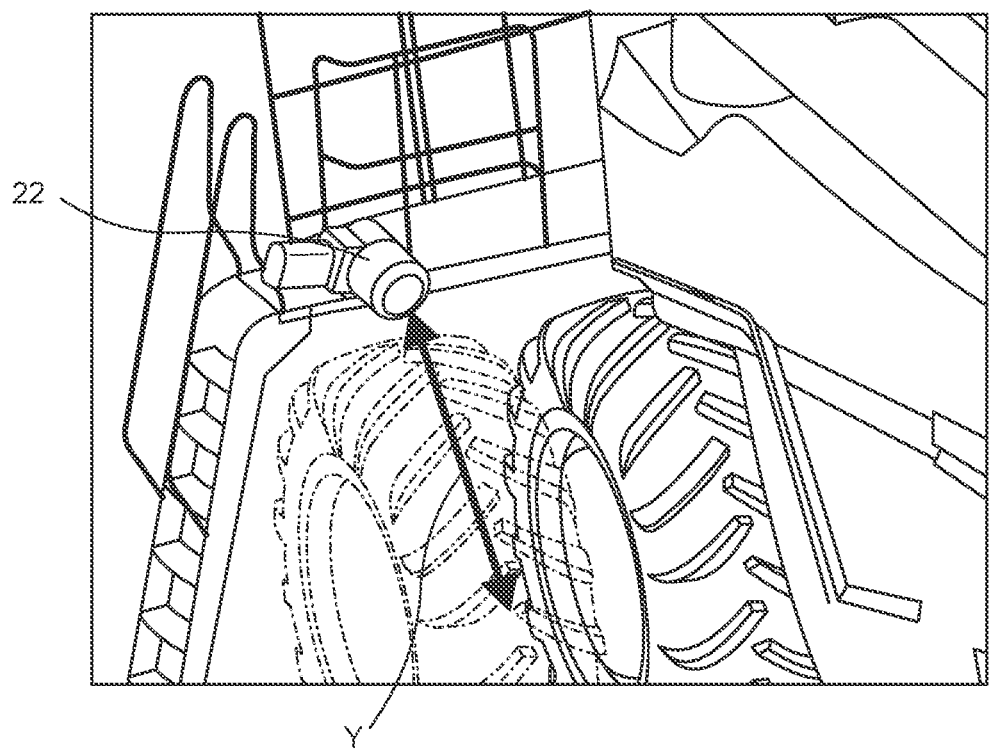
FIG. 5 is a view similar to that of FIG. 4 but illustrating operation of the distance sensor when an outer wheel is absent.

Each distance sensor 22 is mounted to the harvester at a suitable location that is a known distance from the tire 24 of its respective outer wheel 12a. The sensors 22 may be mounted to a body or other structural component of the harvester that is at a fixed, or at least a known, distance from the wheel 12a. The sensors 22 may for example be at a known distance from an axis of rotation of their respective wheels 12a. As shown in FIG. 3, the distance sensors 22 may be mounted to a gantry 40 which runs above the wheels 12a, 12b of the dual-wheel axle, but they could be located on any suitable part of the harvester 10. Since the expected distance between each distance sensor 22 and the surface of the tire 24 of its respective outer wheel 12a is known, distance information provided by each sensor 22 can be used to determine whether the outer wheel 12a is present on the dual axle or not. Accordingly, the controller 26 is configured to compare distance information received from each distance sensor 22 to a threshold range of distances expected to determine if the outer wheel 12a is present. If the outer wheel 12a is present as illustrated in FIG. 4, the measured distance 42 will fall within the threshold range of expected distances and the controller determines that the outer wheel 12a is present. If the outer wheel is not present as illustrated in FIG. 5, the measured distance, indicated by arrow Y, will fall outside of the expected threshold range and the controller 26 will determine that the outer wheel 12a is not present, or at least cannot determine that it is present.

The outer circumferential surface 24a of each tire 24 is profiled to define a tread which includes a series of raised tread formations or lugs 44 arranged in a pattern and separated by grooves 46. This is a typical tread arrangement for tires on an agricultural mobile machine, but tread arrangements comprising other types of raised tread features, such as blocks, ribs or the like, separated by grooves are also known. For ease of reference, the term "tread features" is used to define any raised feature of a tire tread including lugs, blocks, ribs and the like, and the term "groove" is used to define the regions between such tread features.

Figure 6:
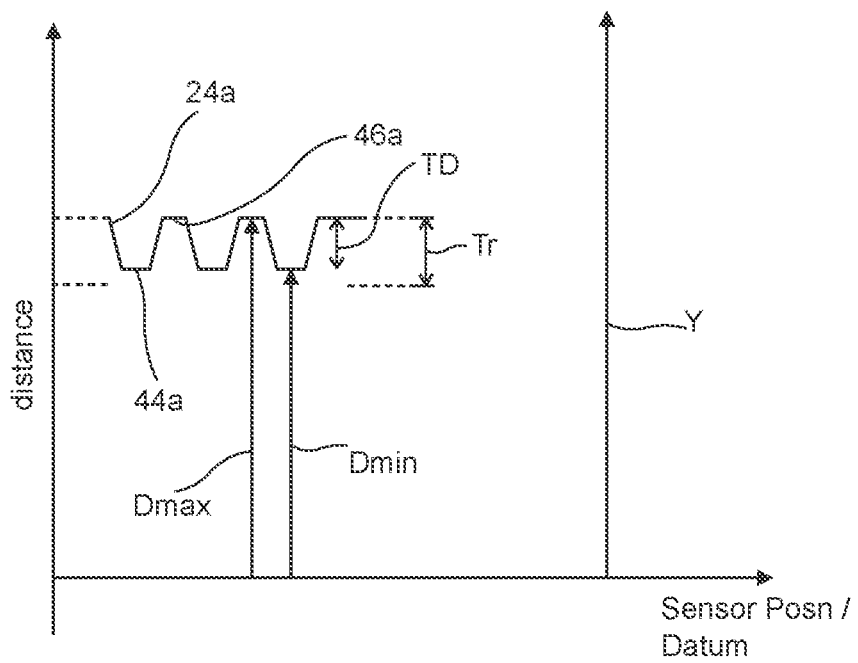
FIG. 6 is a graphic illustration of the distance information obtained by the distance sensor in FIGS. 4 and 5.

With reference to FIG. 6, the actual distance measured between a distance sensor 22 and the outer circumferential surface 24a of a tire 24 will depend on where the measurement is taken, with a minimum distance $D_{min}$ being measured at the outer surfaces 44a of the lugs 44 and a maximum distance $D_{max}$ measured at the base 46a of the grooves 46. The dual-wheel detection system 20 is configured to carry out distance measurements to the tire in two modes: an absolute mode in which a minimum distance $D_{min}$ between the sensor 22 and the tire 24 is measured at the outer surfaces of the tread features; and a relative mode in which differences between a minimum distance $D_{min}$ between the sensor 22 and the tire 24 measured at the outer surfaces of the tread features and a maximum distance $D_{max}$ measured at the bottom of the grooves 46 as the wheel 12a rotates is used to determine the depth of the tread TD.

To detect the presence of an outer wheel 12a of the dual axle, the system may use the absolute mode to determine the minimum distance $D_{min}$. In this case the threshold range may only include a range of expected minimum distances $D_{min}$. However, in other modes of measurement, the threshold range Tr can encompass any expected distances between the minimum and maximum allowing for tolerances, tire wear and variations in tire pressures as indicated by the dashed lines in FIG. 6. If the outer wheel 12a is not present, the distance sensor would typically report a distance measurement, indicated by arrow Y in FIGS. 5 and 6, which is significantly longer than would be expected if the wheel 12a is present, and so the threshold range can be defined fairly broadly to reduce the risk of the system falsely determining that the wheel 12a is absent.

In an embodiment, the relative mode of measurement is used when the machine is moving to check that the sensor 22 has not been tampered with. Though it might be possible to fool the sensor 22 into thinking that it is measuring a minimum distance to a wheel, it would be more difficult replicate the "sawtooth" waveform that would be produced by the sensor 22 in the relative mode of measurement. The relative mode can be used as a system check or can be used to confirm that the wheel 12a is present instead of, or in addition to, the absolute mode.

Figure 7:
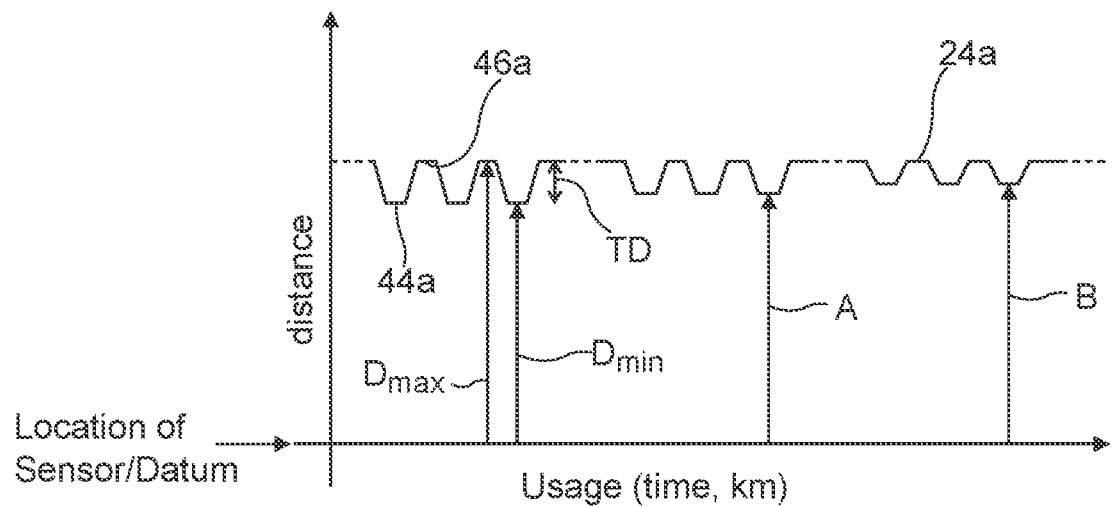
FIG. 7 is a graphic illustration similar to that of FIG. 6 but illustrating how distance information from the distance sensor can be used to monitor tire wear; and, FIG. 8 is a graphic illustration similar to that of FIG. 6 but illustrating how distance information from the distance sensor can be used to determine the size (radius or diameter) of a wheel.

The minimum distance $D_{min}$ between the sensor 22 and the tire 24 will vary as the tire 24 wears. This is illustrated in FIG. 7, which shows the minimum distance $D_{min}$ increasing over time as the tire wears and the tread depth TD ($D_{max}-D_{min}$) decreasing. The threshold range of expected distances indicative that an outer wheel 12a is present is configured to take account of expected tire wear.

Figure 8:
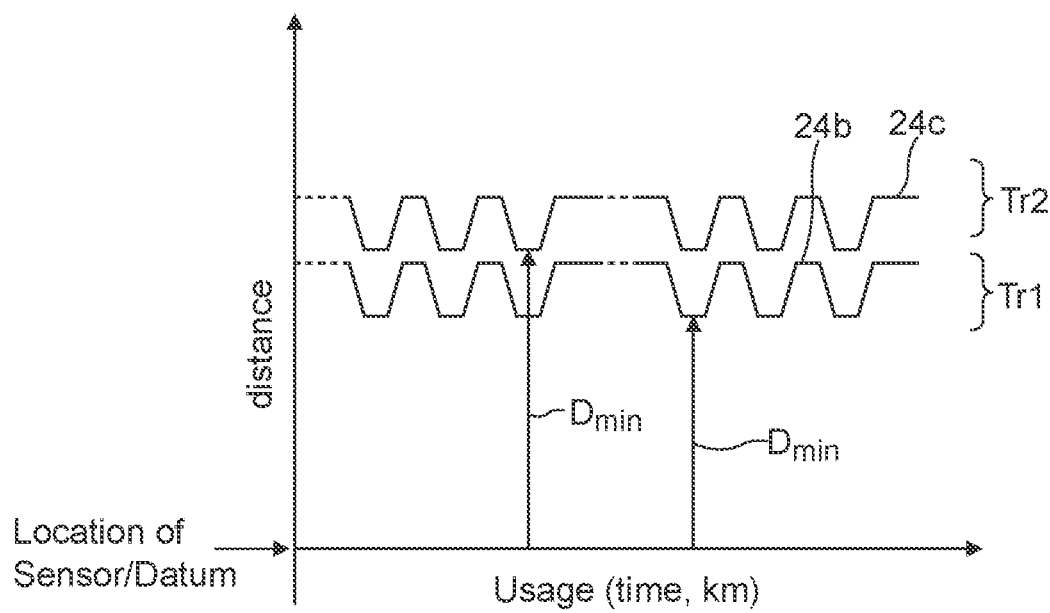

The expected distance between a distance sensor 22 and its respective outer wheel 12a is also dependent on the size of the wheel 12a. This is illustrated in FIG. 8, which illustrates how the distance from a sensor to the outer surface 24a of the tire 24 varies between a larger wheel 24b and a smaller wheel 24c, the profile 24c of the tire for the smaller wheel being shown above the profile 24b for the larger wheel.

In some cases, a harvester 10 or other mobile machine may be operable with wheels of different sizes. These might be selectable as an option on first purchase, or a machine could be provided with sets of wheels of different sizes which can be selectively fitted to the harvester 10 as required. In this case, the threshold range of expected distances Tr may be selected to encompass all expected distances regardless of which of the permitted wheel sizes are fitted to the machine. Alternatively, the system may be configured such that the controller 26 selects a threshold range Tr1, Tr2 suitable for the particular size of wheel actually fitted. The system 20 may be arranged so that data regarding size of wheel fitted is entered or an option for the wheel size selected, such as via the HMI 28, and the controller 26 selects an appropriate threshold range accordingly.

In an embodiment, the system 20 is configured to automatically determine the size of wheel fitted based on the distance information from the distance sensor 22 and to select an appropriate threshold range accordingly. Since the position of the sensor 22 is known relative to an axis of rotation of the wheel, the controller 26 is able to calculate the radius of the wheel (measured at the outer circumferential surface of the tire 24) from the distance information. This may be determined from the minimum distance $D_{min}$ for example. This is illustrated in FIG. 8, which shows distance measurements to the thread profiles 24b, 24c of two differently sized wheels. For a wheel of a first size (e.g., R38) as indicated by profile 24b, a first threshold range Tr1 of distances may be appropriate to determine if the wheel is present. For a second smaller wheel size (e.g., R32) as indicated by profile 24c, a different threshold range Tr2 of distances may be appropriate. In an embodiment, the system is configured to correlate the measured wheel radius to a standard wheel size. In this regard, the system may compare the measured wheel radius with data relating to a range of standard wheels to determine which standard wheel size the wheel conforms to. Wheel size data for a range of standard wheel sizes expected to be used on the harvester 10 can be stored in the memory 32, for example in a lookup table. With reference to the embodiment in FIG. 8, the controller 26 is programmed to determine from the measured wheel radius whether the wheel is an R32 or an R38. The controller may store the determined wheel size in memory 32 and/or may update a control model to incorporate the wheel size data. This in effect uses the system for measuring wheel radius to automatically determine the wheel size rather than have the user select the wheel size from a menu option.

It will be appreciated that references herein to measuring a radius of a tire are intended to include measuring of the diameter of a tire, or any other directly relatable dimension of the tire.

Threshold ranges Tr of expected distances from a distance sensor 22 to the outer circumferential surface 24a of a tire of its respective wheel 12a is saved in a memory location accessible by the processor 30 of the controller 26. This may be the memory 32 of the controller or some other memory. Where more than one threshold range is required, each will be saved to the memory. The threshold range or ranges may be pre-set, such as by a manufacturer, or the system may be configured to enable values for threshold ranges to be input or updated. This might be desirable to enable the harvester 10 to be fitted with non-standard wheel sizes, for example, and might be effected through the HMI or the threshold range or ranges configured remotely and downloaded to the system.

Functionality of the dual-wheel detection software and method according to one embodiment will now be described.

As part of a start-up procedure for the harvester 10, the controller 26 may display a message to an operator using the HMI 28 display screen asking the operator to confirm that the outer or external dual wheels are present. If the operator enters a negative response, the system 20 may issue a warning that the machine should not be operated without the outer wheels present. The controller 26 may also inhibit start-up so that the machine cannot be driven or may only allow a limited use of the machine, for example with any rollover risk reduction and/or stability control systems operating on the assumption that the outer wheels are not present and which may use an axle length d based on the distance between the inner wheels of the dual-wheel axle or based on the axle length of the rear axle (whichever is larger) to determine maximum permitted steering angles and/or maximum permitted speed and the like.

If the operator enters a positive response, this is recorded in the memory and the distance sensors 22 interrogated to determine whether the outer wheels 12a are present. If both outer wheels 12a are determined to be present, the system 20 enables the machine to proceed with other start-up procedures as may be required and to be operated normally in accordance with other control functionality of the machine. In particular, a rollover risk reduction and/or stability safety system will be operated on the assumption that both the inner and outer wheels of the dual-wheel axle 16 are present and an axle distance d based on the spacing between the outer wheels 12a of the dual-wheel axle adopted as required in an algorithm to determine a maximum permitted steering angle and/or a maximum permitted ground speed and the like.

If the controller 26 determines that at least one outer wheel 12a is not present (or to put it another way does not determine that both outer wheels are present), the system may display a warning message to the operator asking them to confirm that the outer wheels 12a are in fact present and/or to check the dual-wheel monitoring system 20. If the operator confirms that the outer wheels 12a are present but the system 20 still determines that they are not, the system may display messages to the operator to take them through a series of checks to confirm that the system is operating correctly. If the operator confirms that the outer wheels 12a are not present and/or if the system is not able to confirm that both outer wheels 12a are present following any required checks, the controller may issue a warning and inhibit start-up so that the machine cannot be driven or may only allow limited use of the machine. Limited use may comprise any rollover risk reduction and/or stability control systems operating on the assumption that the outer wheels are not present and using an axle length d based on the spacing between the inner wheels of the dual-wheel axle or based on the axle length of the rear axle (whichever is larger) to determine maximum permitted steering angles and/or maximum permitted speed and the like.

The system 20 may periodically check that dual wheels are present while the harvester is in use, or a check may only be made once each time the machine is started. In a further alternative, a check that dual wheels are present is made when the system 20 determines that the machine is being operated under conditions in which correct operation of a rollover risk reduction system or some other stability control system requiring accurate width data for the machine is essential. This might, for example, be initiated when the machine is driven over a threshold speed or a range gear selected indicative that the machine is being driven on a road. Those skilled in the art will appreciate that a dual wheel check can be initiated in accordance with a wide range of protocols. It should also be appreciated that the steps of asking the driver to confirm that the outer wheels are present could be omitted, and the system may be configured to automatically carry out the check for the outer wheels 12a and adopt a suitable axle distance d for any rollover risk reduction or other safety control algorithms depending on whether the outer wheels are detected or not.

Automatic detection of dual wheels can be used to provide an additional level of safety in mobile machines having at least one dual-wheel axle. Automatic detection of dual wheels may be carried out as part of a rollover risk reduction method in which an algorithm uses a width dimension defined by reference to the outer wheels and where operation of the machine without the outer wheels would increase the risk of a rollover event.

The dual-wheel detection methods and systems 20 can be used on mobile machines having a single dual-wheel axle or on mobile machines which have more than one dual-wheel axle. In this latter case, the system may be configured to detect dual wheels on one, some, or all axles which are dual-wheel axles.

In addition to detecting whether the outer wheels 12a of the dual-wheel axle 16 are present, the distance information provided by the distance sensors 22 can be analyzed to provide further useful information such as tire wear, wheel size, and/or for use in determining the ground speed of the harvester.

As discussed previously, when measured in the absolute mode, changes in the minimum distance $D_{min}$ measured by a sensor 22 are indicative of tire wear. Furthermore, when the distance is measured in the relative mode, changing data relating to the tread depth TD (lug height) is also indicative of wear. Accordingly, in an embodiment, the controller 26 is configured to monitor the tire wear by analyzing the minimum distance $D_{min}$ measured in the absolute mode and/or the tread depth TD measured in the relative mode. Typically the system will be calibrated or set to a zero (i.e., no wear) setting when a new tire 24 is fitted by taking reference measurements of the minimum distance $D_{min}$ and tread depth TD, and the system will monitor subsequent changes in minimum distance $D_{min}$ and tread depth TD over time/usage to provide data relating to tire wear and/or condition. In one embodiment, the controller 26 is configured to issue a warning that a change of tire is approaching when the minimum distance $D_{min}$ and/or the tread depth TD reaches a pre-determine value as indicated at A in FIG. 7. A further warning may be issued that the tire must be changed when the minimum distance $D_{min}$ and/or the tread depth TD reaches a second pre-determine value as indicated at B in FIG. 7. In another embodiment, the controller 26 records data relating to tire wear over time and is configured to present information regarding the tire wear status via the HMI 28, such as when requested by an operator input, or which is issued remotely, such as via ACM (telemetry), to enable predictive maintenance of the tires 24. Information regarding tire status may be forwarded remotely to a dealer, for example. In an embodiment, the controller 26 is configured to map tire wear over the lifecycle of a tire 24 by logging the minimum distance $D_{min}$ and tread depth TD, or changes thereto, measured over time. In an embodiment, the controller 26 is adapted to receive data relating to ground speed, which may be provided by a speed sensor of the machine; and/or engine use (elapsed engine hours), which may be provided by engine control system of the harvester 10.

In an embodiment, the controller 26 is configured to combine the tire wear data with the ground speed data and/or engine use data to provide tire wear status information correlated to the use of the harvester 10.

Where the system 20 and controller 26 are configured to monitor tire wear, this may be extended to other wheels on the harvester and is not limited to the outer wheels 12a of the dual-wheel axle. As illustrated in FIG. 2, an additional distance sensors 22a may be provided for each of the inner wheels 12b of the dual-wheel axle, and the controller 26 configured to analyze distance data from all the distance sensors 22, 22a in order to monitor tire wear of all the wheels 12a, 12b on the dual-wheel axle. Monitoring of tire wear can also be extend to the wheels 12 on the rear axle 14 by providing additional distance sensors 22b for each of the rear wheels 12.

If the system 20 is configured to automatically determine the radius of the tire and/or wheel size, this data can be used to provide an input to other control systems on the harvester 10. For example, it is known to provide a combine harvester with systems which adjust the height of an axle. One example is a body levelling system which maintains the body of the harvester level when working on a slope. Such a system is disclosed in U.S. Pat. No. 11,110,771, "Wheel Axle for a Combine Harvester," granted Sep. 7, 2021, and is operative to vary the height of the body relative to the axle. Such systems are sometimes also configured to change the total vehicle height. Vehicles driving public roads may be subject to a limit on total height. For example, a height limit of 4 m is currently applied in the European Union. To ensure that a combine harvester can meet this requirement when travelling on a road, the body levelling system can be used to lower the axle height so that the total height of the vehicle does not exceed the limit. However, correct positioning of the axle is dependent on wheel size. Typically in the known systems, the wheel size is selected or entered by an operator using an HMI 28. However, use of the distance information provided by the distance sensors 22 to automatically detect the size of wheel fitted can automate this process with the wheel size data determined by the system 20 being used as an input to the levelling system for correct positioning of the axle for road use.

For the avoidance of doubt, it should be understood that references herein to a wheel should be considered to include a tire fitted to the wheel unless the context requires otherwise.

Use of the distance information provided by a distance sensor 22 to determine wheel size/radius is not limited to application to the outer wheels 12a of the dual-wheel axle 16 but could be extended to all wheels on the dual-wheel axle as illustrated in FIG. 2 by providing further distance sensors 22a for each of the inner wheels 12b. Automatic detection of wheel size/radius can be extend to the wheels 12 on the rear axle 14 by providing additional distance sensors 22b for each of the rear wheels.

If a harvester or other mobile machine has such a body levelling system or any other system to vary the axle height, data from this body levelling/axle height adjustment system may be provided to the controller 26 so that the controller can correct for changes in the relative position between the sensor 22 and the tire 24, e.g., when checking for the presence of the outer wheels 12a and/or for tire wear monitoring and/or for measuring the tire radius. Alternatively, the controller 26 may be configured so that it will only check for the presence of the outer wheels 12a and/or monitor tire wear and/or measure the wheel radius when the axle levelling/axle height adjustment system is in a known datum configuration or not active.

Use of a distance sensor 22, 22a, 22b to measure the radius of a tire 24 can be advantageous in providing ground speed data for the machine. Typically, ground speed is determined using a sensor in the gearbox/drive train of the machine to detect rotation of a component whose speed of rotation is fixed relative to the speed of rotation of wheels driven from the component. From this data, the ground speed is calculated based on an assumed radius (and hence an assumed circumference) of the driven wheels. However, if the radius of the driven wheels is measured using a distance sensor 22, 22a, 22b as described above, the actual measured radius of the driven wheels (or the actual circumference calculated from the measured radius) can be used in place of the assumed radius to provide more accurate ground speed data. As the tire wears, the system is able to detect changes in the wheel radius so that ground speed data accuracy is maintained.

If the radius of more than one driven wheel is measured by the system 20, an average of the measured wheel radii may be used for the ground speed calculation. A measured radius of a non-driven wheel could alternatively be used provided the non-driven wheel is ostensibly the same size as the driven wheels or an offset used if the wheel sizes are different. This may be less accurate but still acceptable.

If the system determines which of a range of standard wheel sizes is actually fitted, data relating to the dimensions of the standard wheel size may be used instead of the actual measured radius for calculating ground speed. This at least ensures that the ground speed calculation is based on the actual size of wheel fitted to the harvester.

Tire wear monitoring and automatic wheel-size detection can be combined in the system 20 for use on a combine harvester or any other mobile machine or vehicle as desired.

When used only to detect the presence of a wheel 12a, the alignment of a distance sensor 22 to the wheel 12a is not critical, because the thresholds are relatively large and may be in the range of hundreds of millimeters. When used for tire wear or wheel-size detection, the alignment should be known, and for tire wear will advantageously permit the tread height measurement. In an embodiment, each sensor 22 is aligned at an angle in the range of 60° to 120° relative to a plane tangential to the outer surface of the tire, or at an angle in the range of 80° to 100° relative to a plane tangential to the outer surface of the tire, or at an angle in the range of 90° to 100° relative to a plane tangential to the outer surface of the tire, but other angles are possible. Furthermore, when used to detect the presence of a wheel, it is not essential that the sensor be configured to detect information relation to the distance between the sensor and the outer circumferential surface of the wheel but could be aligned to measure a distance to any part of the wheel provided the expected distance is known with sufficient accuracy.

Measurements for monitoring wear of tires 24 or wheel size may be carried out by the system on a periodic basis and may be made when the vehicle is stationary (in absolute mode) and/or when travelling at relatively slow speeds to minimize the effect of tire deformation and/or suspension movement changing the spacing between the sensor and the wheel. Alternatively, readings from the distance sensors may be averaged over time or otherwise processed to eliminate the effect of tire deformation and/or suspension movement.

Thus, some systems and methods disclosed herein automatically detect whether outer wheels are present on a dual-wheel axle. A benefit is in rollover risk reduction systems and method in machines intended to be used with dual wheels on a dual-wheel axle, because the systems, which rely on the distance between outer wheels, can automatically detect whether the outer wheels of the dual-wheel axle are present.

Various modifications to the dual-wheel detection methods and system according to the disclosure will be apparent to those skilled in the art, without departing from the scope of the disclosure.

All references cited herein are incorporated herein in their entireties. If there is a conflict between definitions herein and in an incorporated reference, the definition herein shall control.

The invention claimed is:

1. A method of detecting a presence of dual wheels on a dual-wheel axle of a mobile machine, the method comprising:
    using a distance sensor mounted to the mobile machine to determine whether an outer wheel of the dual-wheel axle is present;
    using presence or absence of the outer wheel to assess a rollover risk of the mobile machine; and
    adopting at least one of a maximum steering angle and a maximum ground speed for the mobile machine based at least in part on the presence or absence of the outer wheel of the dual-wheel axle.

2. The method of claim 1, further comprising:
    comparing distance information from the distance sensor with an expected threshold range of distances indicative that the outer wheel is present; and
    determining whether the outer wheel is present based at least in part on whether the distance information falls within the expected threshold range.

3. The method of claim 1, further comprising using a second distance sensor to determine whether a second outer wheel is present on an opposite side of the dual-wheel axle.

4. The method of claim 1, wherein the method comprises using the distance sensor to measure a distance between the sensor and an outer circumferential surface of a tire of the outer wheel when the outer wheel is present.

5. The method of claim 4, wherein measuring the distance between the distance sensor and the outer circumferential surface of the tire comprises measuring a minimum distance between the sensor and the tire at outer surfaces of tread features of the tire.

6. The method of claim 5, further comprising using the distance information from the distance sensor to monitor tire wear.

7. The method of claim 5, wherein measuring the distance between the distance sensor and the outer circumferential surface of the tire further comprises measuring a maximum distance between the sensor and the tire measured at a bottom of grooves between the tread features as the wheel rotates.

8. The method of claim 7, further comprising using the minimum distance and the maximum distance to determine a depth of the tread features.

9. The method of claim 1, further comprising:
receiving, at a controller, distance information from the distance sensor; and
determining, with the controller and based at least in part on the distance information, whether the outer wheel is present.

10. A method of detecting a presence of dual wheels on a dual-wheel axle of a mobile machine, the method comprising:
using a distance sensor mounted to the mobile machine to determine whether an outer wheel of the dual-wheel axle is present; and
using distance information from the distance sensor to determine a radius of the outer wheel.

11. The method of claim 10, wherein the method comprises using the distance sensor to measure a distance between the sensor and an outer circumferential surface of a tire of the outer wheel when the outer wheel is present.

12. The method of claim 11, wherein measuring the distance between the distance sensor and the outer circumferential surface of the tire comprises measuring a minimum distance between the sensor and the tire at outer surfaces of tread features of the tire.

13. The method of claim 12, wherein measuring the distance between the distance sensor and the outer circumferential surface of the tire further comprises measuring a maximum distance between the sensor and the tire measured at a bottom of grooves between the tread features as the wheel rotates.

14. A system for detecting a presence of dual wheels on a dual-wheel axle of a mobile machine, the system comprising:
a distance sensor mounted to the mobile machine having a dual-wheel axle, the distance sensor configured to detect distance information relating to a distance between a known datum and a part of an outer wheel of the dual-wheel axle when the outer wheel is present on the dual-wheel axle; and
at least one controller configured to receive distance information from the distance sensor and to determine whether the outer wheel is present on the dual-wheel axle based at least in part on the distance information, use presence or absence of the outer wheel to assess a rollover risk of the mobile machine, and adopt at least one of a maximum steering angle and a maximum ground speed for the mobile machine based at least in part on the presence or absence of the outer wheel of the dual-wheel axle.

15. The system of claim 14, wherein the distance sensor is mounted to the mobile machine at a location which is fixed relative to a location occupied by the outer wheel when the outer wheel is present on the dual-wheel axle.

16. The system of claim 14, further comprising:
a second distance sensor mounted to the mobile machine, the second distance sensor configured to detect distance information relating to a distance between a second known datum and a part of a second outer wheel of the dual-wheel axle when the second outer wheel is present on the dual-wheel axle;
wherein the at least one controller is further configured to receive distance information from the second distance sensor and to determine whether the second outer wheel is present on the dual-wheel axle based at least in part on the distance information received from the second distance sensor and adopt at least one of a maximum steering angle and a maximum ground speed for the mobile machine based at least in part on the presence or absence of the outer wheel of the dual-wheel axle.

17. The system of claim 16, wherein the second sensor is mounted to the mobile machine at a location which is fixed relative to a location occupied by the second outer wheel when the second outer wheel is present on the dual-wheel axle.

18. The system of claim 14, wherein the distance sensor comprises a sensor selected from the group consisting of an ultrasonic sensor and a laser sensor.

19. The system of claim 14, wherein the at least one controller is configured to compare the distance information from the distance sensor with a threshold range of expected distances indicative that the outer wheel is present, and to determine whether the outer wheel is present based at least in part on whether the distance information falls within the threshold range.

20. The system of claim 14, wherein, the distance sensor is configured to detect information relating to a distance between the known datum and an outer circumferential surface of a tire of the outer wheel.

21. The system of claim 14, wherein the known datum is a position of the distance sensor.

* * * * *